United States Patent

Fusi

[11] Patent Number: 5,159,367
[45] Date of Patent: Oct. 27, 1992

[54] APPARATUS FOR TAKING IDENTIFICATION PHOTOGRAPHS

[75] Inventor: Giuliano Fusi, Florence, Italy

[73] Assignee: Industria Fototecnica Firenze SpA, Florence, Italy

[21] Appl. No.: 491,491

[22] Filed: Mar. 9, 1990

[30] Foreign Application Priority Data

Mar. 15, 1989 [IT] Italy .................. 9369 A/89

[51] Int. Cl.⁵ .................. G03B 15/06; G03B 29/00
[52] U.S. Cl. .................. 354/80; 354/118; 354/150; 354/290
[58] Field of Search .............. 354/80, 105, 110, 118, 354/126, 150, 290, 117

[56] References Cited

U.S. PATENT DOCUMENTS

| | | | |
|---|---|---|---|
| 862,354 | 8/1907 | Stevens | 354/117 |
| 2,329,294 | 9/1943 | Ramsdell | 354/117 |
| 2,403,733 | 7/1946 | Mainardi et al. | 354/117 |
| 2,413,996 | 1/1947 | Ramsell | 354/117 |
| 3,820,130 | 6/1974 | Cornelison et al. | 354/150 |
| 4,236,795 | 12/1980 | Kephart | 354/80 |
| 4,309,094 | 1/1982 | Bollen | 354/80 |
| 4,361,388 | 11/1982 | Mlcak et al. | 354/106 |

Primary Examiner—A. A. Mathews
Attorney, Agent, or Firm—McGlew & Tuttle

[57] ABSTRACT

The apparatus comprises a camera (13) in front of which two reflecting surfaces (11A, 11B) are disposed in vertical planes inclined to each other and symmetrical with respect to the axis of the camera; a pair of mirrors (17A, 17B) send back the image of the subject (S), taken on two different angles, towards said reflecting surfaces (11A, 11B) which project the images towards the objective (15).

15 Claims, 4 Drawing Sheets

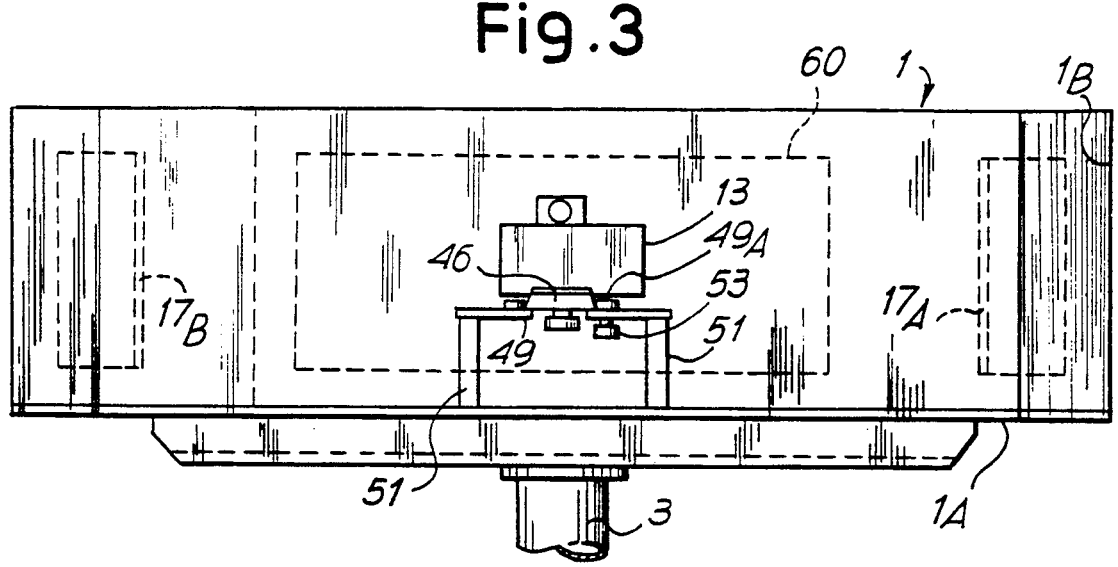
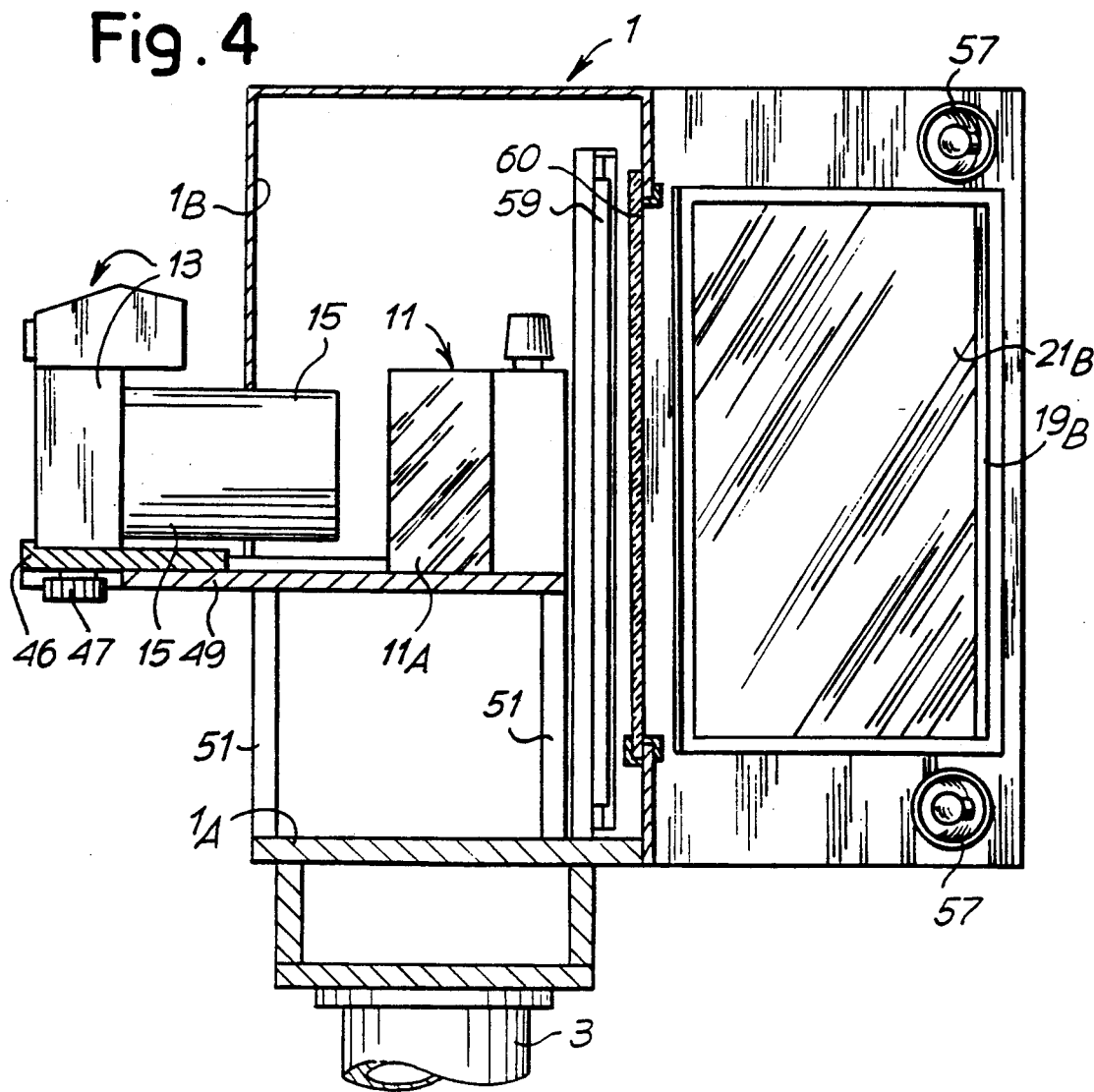

APPARATUS FOR TAKING IDENTIFICATION PHOTOGRAPHS

FIELD AND BACKGROUND OF THE INVENTION

The invention relates to an apparatus for taking identification photographs, i.e. for shooting two pictures of a same subject according to different angles and, in particular, a front picture and a side picture to be reproduced on the same exposure.

At present there exist photographic devices able to provide identification photographs, by means of which it is possible to impress, on a single exposure, a front view and a side view of a same subject. These known devices, which are commonly used by the police for taking identification photographs, are particularly complex, expensive and cumbersome and make use of especially designed cameras which are also of complex construction and provided with a dual shutter.

SUMMARY AND OBJECTS OF THE INVENTION

It is an object of the invention to provide an apparatus for taking identification photographs which does not exhibit the disadvantages of the known devices. In particular, the invention has the purpose to provide a simple, light and economical apparatus which is of easy installation and use and which does not require in practice any maintenance. This makes it possible to use it in the most diverse and difficult situations.

Substantially the apparatus according to the invention comprises a camera provided in front of its lens, with two reflecting surfaces (11A, 11B) inclined to one another to send back towards the same lens, two images of the subject to be photographed, which are reflected by corresponding mirrors disposed next to the subject.

The two reflecting surfaces disposed in front of the camera objective reflect onto the exposure two adjacent images which can be shot through a single release of the shutter. The camera may therefore be a normal "reflex" camera. Of particular advantage is the use of a reflex camera equipped with a back allowing a series of data to be impressed on the exposure. The data being shot for the identification of the place, date and time in which the photo has been taken, or other useful information preset by the operator as necessary. This avoids the use of panels disposed behind the subject, or of other means presently used, to impress on each photogram the required information. All the systems presently known, are in fact, very complex and have the difficulty of simultaneous focusing of the subject to be photographed and of data to be impressed on the photogram. The apparatus according to the invention overcomes all these drawbacks and, in addition, is of extremely simple construction.

In practice, the reflecting surfaces are disposed on vertical planes inclined to each other to form a dihedral whose bisector plane contains the lens axis of said camera. The mirrors are disposed substantially symmetrical with respect to said bisector plane.

Advantageously, the reflecting surfaces are carried by an angularly adjustable support allowing the apparatus to be easily set up. Moreover, means may be provided for adjusting the inclination of the mirrors which send back the images to said reflecting surfaces.

The reflecting surfaces may consist of two inclined mirrors, a pair of optical prisms or equivalent means.

In order to protect the reflecting elements, the apparatus may be provided with a housing having suitable slots within which said reflecting surfaces and said mirrors are disposed. The housing may be combined with a basement movable on pivoting wheels provided with means for locking the wheels. In this way, the apparatus may easily transported to the place where it is to be used.

In a particularly advantageous embodiment, means are disposed inside said housing for illuminating the subject during the shot, and possibly other means may be provided for illuminating the subject during the focusing. The apparatus equipped in this way is entirely self-contained and can be used also for outdoor shooting.

To the apparatus, means may be associated for guiding and blocking a camera of traditional type, said means being disposed in correspondence of said reflecting surfaces and cooperating with corresponding means that may be mounted on said camera.

When taking a picture, the subject is made to sit on a stool able to be connected to the apparatus basement. The stool may be provided with means able to form a background for the shooting of the subject.

The invention will be better understood by following the description and the attached drawing, which shows a practical, not limiting example of said invention. In the drawing:

BRIEF DESCRIPTION OF THE DRAWINGS

FIG. 1A shows an enlarged detail of FIG. 1;

FIG. 3 shows a rear according to line III—III of FIG. 1;

FIG. 4 shows a local section according to line IV—IV of FIG. 1;

DESCRIPTION OF THE PREFERRED EMBODIMENTS

The illustrated apparatus comprises a housing, generically indicated by 1, which is supported by a column 3 applied to a T-shaped basement 5 movable on pivoting wheels 7. The position of the pivoting wheels 7 with respect to the basement 5 can be adjusted in height by cranks or handwheels 9, so that the basement 5 may rest alternatively on the floor P through the feet 5A during the use of the apparatus, or through the pivoting wheels 7 when it must be moved from one position to another.

Figure 1:
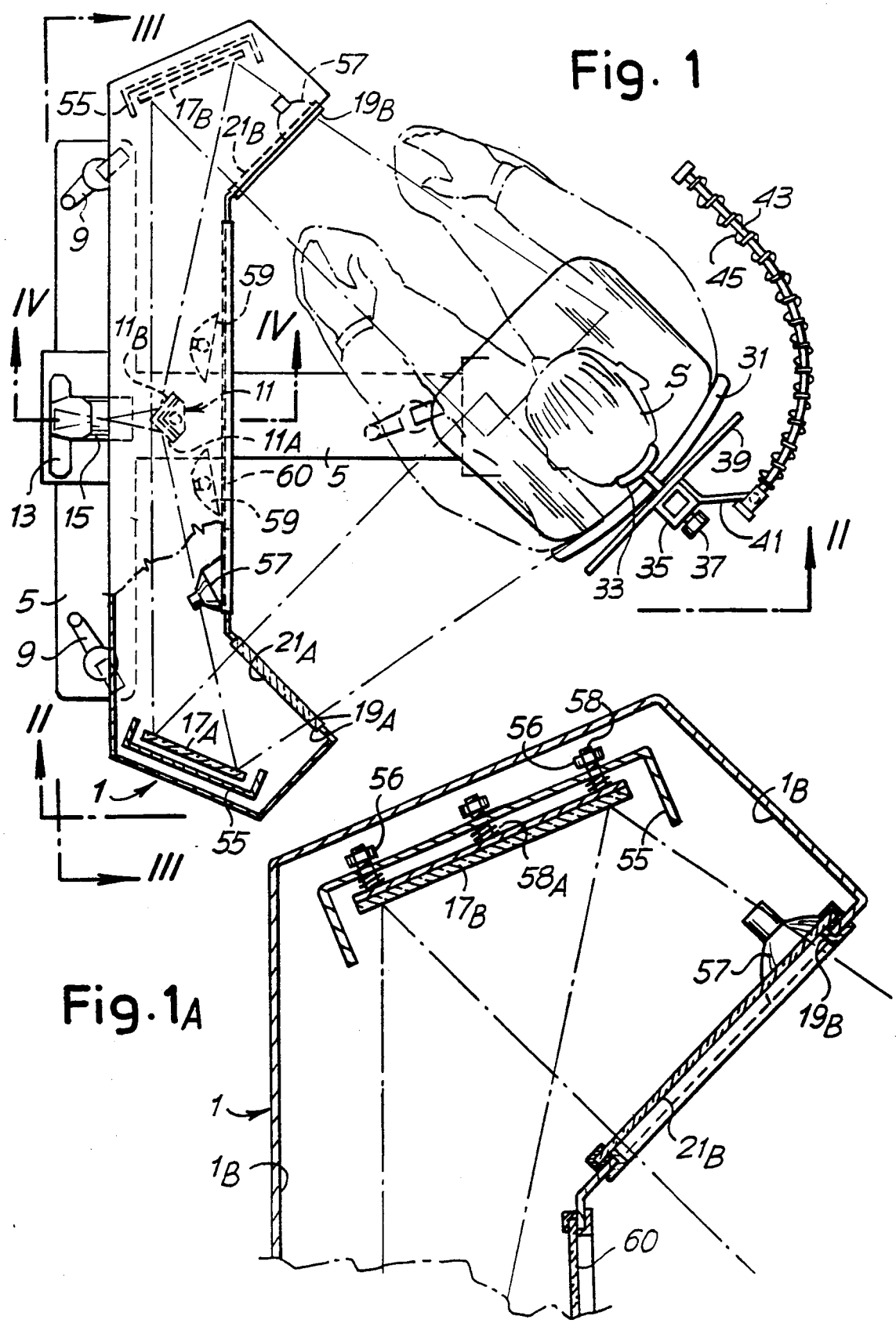
FIG. 1 shows a partially sectioned plan view of the apparatus according to the invention.
Figure 2:
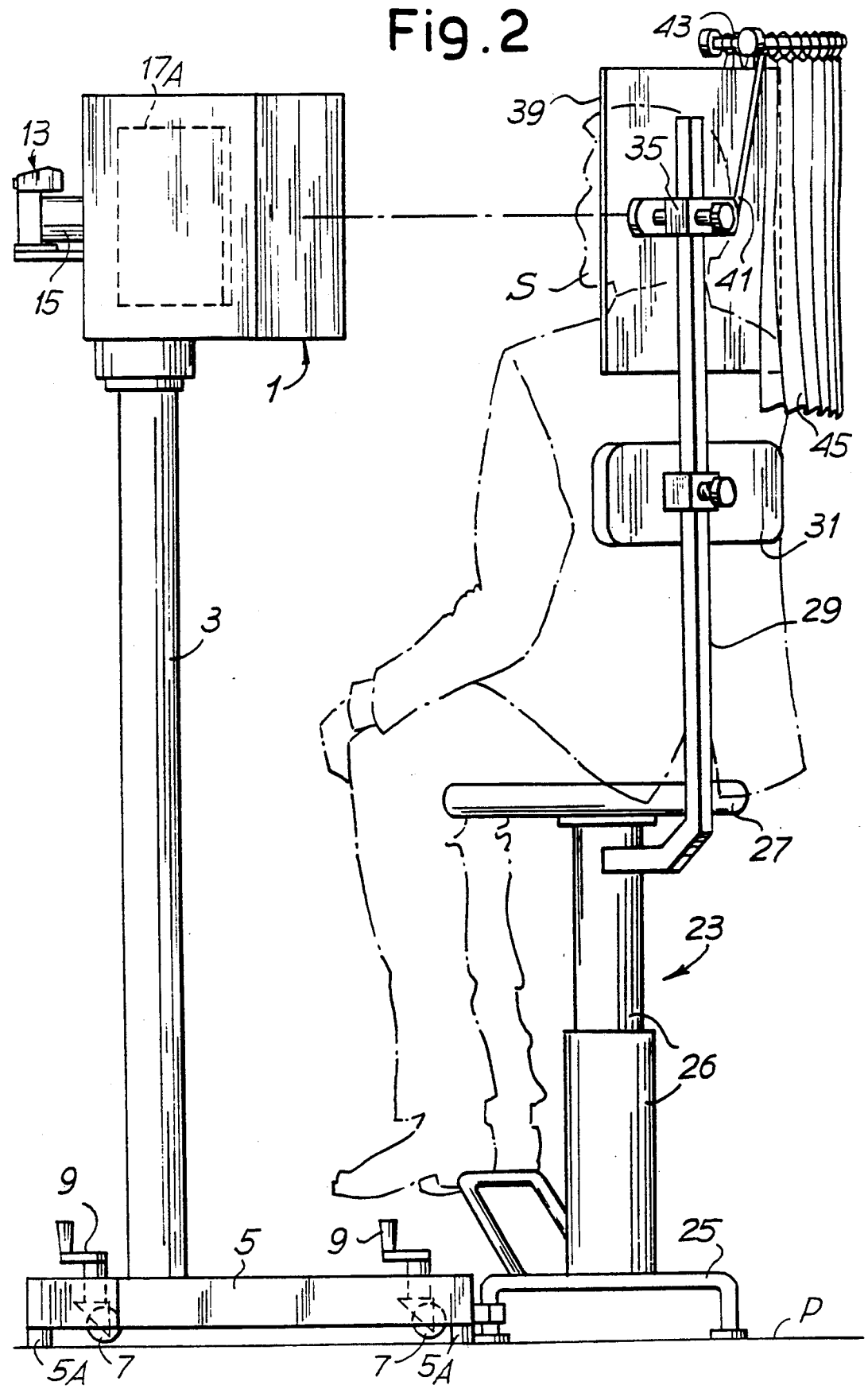
FIG. 2 shows a side according to line II—II of FIG. 1.

The housing 1 is substantially C-shaped (see in particular FIG. 1), and in its central position there is disposed a support 11 for a pair of reflecting surfaces 11A, 11B, arranged according to vertical planes being at 90° to one another. The surfaces 11A, 11B may be two mirrors or the surfaces of an optical prism as well, as described below in greater detail. In any case, irrespective of the construction of said surfaces 11A, 11B, their position with respect to the housing 1 can be so adjusted as to bring the bisector plane of the dihedral, formed by the planes of the reflecting surfaces 11A, 11B, into alignment with the lens of a camera 13 combined with housing 1. The camera 13 may be a usual "reflex" camera equipped with an objective 15 having suitable focal length. The axis of the objective 15 lies in the bisector plane of the dihedral formed by the planes on which the surfaces 11A, 11B are located.

The reflecting surfaces 11A, and 11B reflect towards the objective 15, and thus towards the film, a light beam coming from two mirrors 17A, and 17B, which are positioned, in an adjustable manner as described below, in front of two apertures 19A, and 19B closed by corresponding plates 21A, and 21B made of glass or other suitable, transparent material. The apertures 19A, 19B make it possible to see—through the eyepiece of camera 13, reflecting surfaces 11A, 11B, mirrors 17A, 17B and plates 21A, 21B—a subject S sitting in front of the apparatus in shot attitude. The subject S is made to sit in front of the apparatus so as to face one of the mirrors 17, in particular, in front of mirror 17B in the illustrated example. In this way, while the mirror 17B sends back, towards the objective 15 of camera 13, the front image of the subject, the mirror 17A sends back, towards the same objective 15, the side view of the same subject. The disposition is such that by shooting the photo, the front view and the side view of the subject S to be recorded, are printed one next to the other on the same photogram.

To allow the same subject S to take up the correct attitude in front of the objective, a stool 23 is provided having a seat 27 adjustable in height by means of a cylinder-piston system, a screw, or the like, equipped with a basement 25 and an upright 26, which basement is able to be anchored to basement 5 of the shooting apparatus. In this way it is possible to keep or restore the position of stool 23 with respect to the basement 5 every time the apparatus is moved. To the upright 26 a rod 29 is applied carrying a seatback 31, which can be adjustable in height, and a headrest 33 carried by a slide 35 sliding along the rod 29 and able to be blocked in the desired position with respect to the latter by means of a screw knob 37 or the like. Solid to the slide 35 there is a panel 39 with a dual graduated scale which is reproduced on the photogram together with the front image of the subject S, allowing the size of the subject's head to be assessed as a further distinctive sign. The slide 35 further carries an arm 41 to which a round bar 43 is connected for holding a curtain 45 which provides a background during the shooting.

The camera 13, which, as already mentioned, may be a normal reflex camera or similar photographic unit, is blocked on the apparatus by applying a bracket 46 at the bottom of the body of the camera by means of a screw knob 47; the bracket 46 is blocked on dovetail guides 49 solid to the housing 1 by means of columns 51 or similar. The dovetail slide 49 has a mobile portion 49A to allow the blocking and releasing of bracket 46 through an eccentric operated by a knob 53 or similar blocking means. The dovetail guides 49 and the bracket 46 allow an adjustment of the position of camera 13 relative to the reflecting surfaces 11A, 11B.

To allow the adjustment of mirrors 17A, 17B, these are applied to corresponding C-sections 55, forming seats for receiving the same mirrors (see in particular FIG. 1A), by means of nuts 56 and threaded pins 58, the latter being solid to the mirrors 17A, 17B and passing through corresponding holes in the sections 55. Between the bottom of the C-sections and the rear surface of mirrors 17A, 17B around the threaded pins 58, compression springs 58A are disposed which urge the mirrors to move away from the relevant sections. The threaded pins 58, in number of three for each mirror, allow an adjustment of the position of mirrors 17A, 17B with respect to the housing 1 and thus with respect to the reflecting surfaces 11A, 11B. Once the reflecting surfaces 11A, 11B have been correctly oriented with respect to the objective 15 of camera 13, the mirrors 17A, 17B can be adjusted through the described screw means, so as to correctly centre the reflected image on the photogram. Suitable locknuts, or other appropriate means, lock the mirrors into the correct position. The adjustment of the mirrors and of the reflecting surfaces is carried out upon the assembly of the apparatus and, once the correct position is reached, no further adjusting intervention is required.

The housing 1 may be formed by a base plane 1A (FIG. 4) on which a guard 1B is fitted from above, which guard, on completion of the necessary adjustments, protects the inner optical parts against the dust. In this way, the inside of the apparatus is completely accessible for the adjustments and possible cleaning or repair operations.

Also disposed inside the housing 1 there are the lighting members for the shooting. In particular, lamps 57 may be provided for the very shooting, such as flash lamps, and further lamps 59 may be provided for the focusing of the subject. In the illustrated example, more flash lamps 57 are provided for each picture being taken, which are positioned in correspondence of apertures in the gurad 1A. In the central portion of the housing 1, two neon lamps or similar are provided opposite to a diffuser panel 60. These lamps are intended to illuminate the subject during the focusing and prior to the photo shooting.

Figure 5:
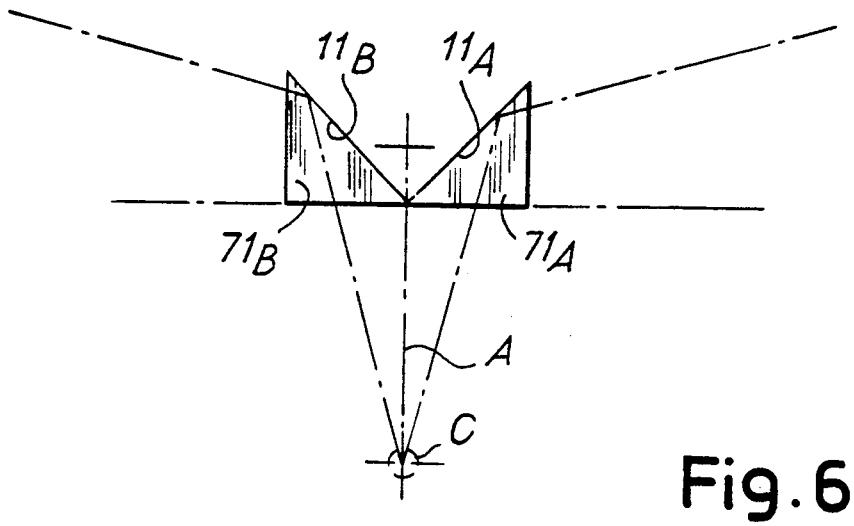
FIGS. 5 to 7 show different possible configurations of the reflecting surfaces disposed in front of the objective.
Figure 6:
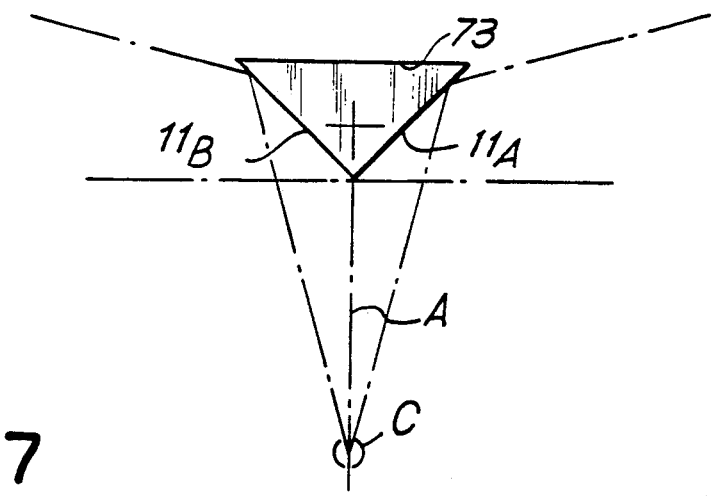
Figure 7:
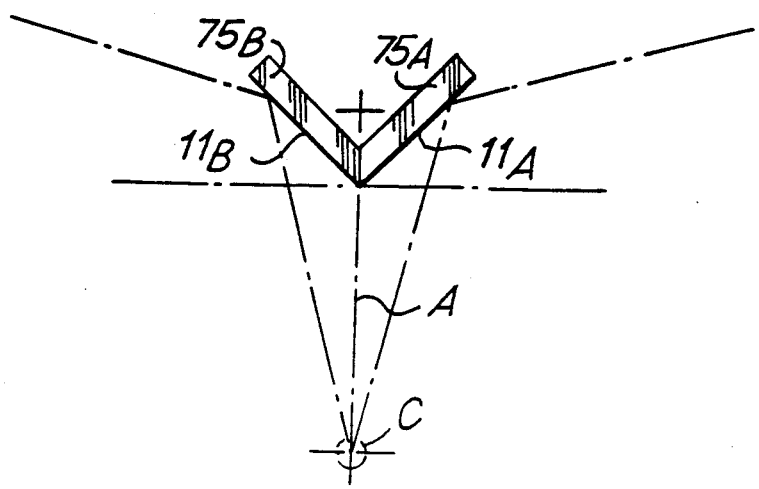

As above mentioned, the reflecting surfaces 11A, 11B may be built in various ways. FIGS. 5 to 7 show schematically possible, non limiting, embodiments of these surfaces. In the solution shown in FIG. 5, the reflecting surfaces 11A, 11B are made up of two optical prisms 71A, 71B symmetrically disposed with respect to the axis of objective 15 of camera 13. In FIGS. 5 to 7 C indicates the centre of the objective 15 and A indicates the axis of same objective 15. In FIG. 6, the surfaces 11A, 11B are formed on a prism 73, while in FIG. 7 the surfaces 11A, 11B consist of two mirrors 75A, 75B. In any case, the surfaces 11A, 11B, however built, are borne by a support which can be adjusted in position in order to centre the images reflected by said surfaces with respect to the axis of objective 15.

I claim:

1. An apparatus for simultaneously photographing front and side views of an object onto a single exposure of a camera, the apparatus comprising:
    a first and second reflecting surface inclined relative to each other, said first and second reflective surfaces being disposed on vertical planes inclined to each other to form a dihedral whose bisector plane contains an axis of an objective of the camera;
    a third reflective surface positioned in front of the object to reflect a front image, of the object, onto the first reflective surface;
    a fourth reflective surface positioned on a side of the object to reflect a side image, of the object, onto the second reflective surface, said third and fourth reflective surfaces being disposed substantially symmetrical with respect to the bisector plane of the dihedral formed by the first and second reflective surfaces; and positioning means for positioning said first and second reflective surfaces to reflect the front and side views of the object onto a first and second portion of the exposure of the camera.

2. An apparatus in accordance with claim 1, wherein: said third and fourth reflective surfaces reflect the front and side images which are angularly separated by a substantially right angle.

3. Apparatus according to claim 1, wherein: said first and second reflecting surfaces are carried by an angularly adjustable support of said positioning means.

4. Apparatus according to claim 1, further comprising: mirror adjustment means for adjusting the inclination of said third and fourth reflective surfaces.

5. Apparatus according to claim 1, wherein: said first and second reflecting surfaces are surfaces of an optical prism.

6. Apparatus according to claim 1, wherein: said first and second reflecting surface are formed on two optical prisms disposed side-by-side and symmetrically with respect to the axis of the objective of the camera, said two optical prisms having substantially 90° angles and sides of said substantially 90° angles being positioned on a plane substantially parallel to the film and one of other angles of each said two optical prisms being in contact.

7. Apparatus according to claim 1, further comprising: a housing within which said first, second, third and fourth reflecting surfaces are disposed, said housing having apertures in correspondence with said third and fourth reflective surfaces.

8. Apparatus according to claim 1 further comprising: guiding means for guiding and blocking the camera, said guiding means being in correspondence with said first and second reflecting surfaces and the camera.

9. Apparatus according to claim 1, wherein: the camera comprises a "reflex" type camera.

10. Apparatus according to claim 1, further comprising: data means for impressing operatorpreset data on the exposure.

11. An apparatus for simultaneously photographing front and side views of an object onto a single exposure of a camera, the apparatus comprising:
a first and second reflecting surface inclined relative to each other, said first and second reflective surfaces being disposed on vertical planes inclined with respect to each other to form a dihedral whose bisector plane contains an axis of an objective of the camera;
a third reflective surface positioned in front of the object to reflect a front image onto the first reflective surface;
a fourth reflective surface positioned on a side of the object to reflect a side image onto the said second reflective surface; and
means for positioning said first and second reflective surfaces to reflect the front and side views of the object onto a first and second portion of the exposure of the camera.

12. An apparatus for combining first and second angularly different images within a camera, the apparatus comprising:
a first and second reflecting surface inclined relative to each other;
a third reflective surface positioned to reflect the first angularly different image onto the first reflective surface;
a fourth reflective surface positioned to reflect the second angularly different image onto the second reflective surface;
said first and second reflective surfaces positioned to reflect the angularly different first and second images onto the exposure of the camera;
a housing within which said first, second, third and fourth reflecting surfaces are disposed, said housing having apertures in correspondence with said third and fourth reflective surfaces; and
light shooting means disposed inside said housing for illumination during the exposure.

13. An apparatus for combining first and second angularly different images within a camera, the apparatus comprising:
a first and second reflecting surface inclined relative to each other;
a third reflective surface positioned to reflect the first angularly different image onto the first reflective surface;
a fourth reflective surface positioned to reflect the second angularly different image onto the second reflective surface; and
said first and second reflective surfaces positioned to reflect the angularly different first and second images onto the exposure of the camera;
a housing within which said first, second, third and fourth reflecting surfaces are disposed, said housing having apertures in correspondence with said third and fourth reflective surfaces; and
light focusing means are disposed inside said housing for illumination during focusing.

14. Apparatus according to claim 13 further comprising: a diffuser panel associated with said light focusing means.

15. An apparatus for combining first and second angularly different images within a camera, the apparatus comprising:
a first and second reflecting surface inclined relative to each other;
a third reflective surface positioned to reflect the first angularly different image onto the first reflective surface;
a fourth reflective surface positioned to reflect the second angularly different image into the second reflective surface;
said first and second reflective surfaces positioned to reflect the angularly different first and second images onto the exposure of the camera; and
a housing within which said first, second, third and fourth reflecting surfaces are disposed, said housing having apertures in correspondence with said third and fourth reflective surfaces; and a basement supporting said housing; a stool connected to said basement and for forming a background.

* * * * *